Patented May 9, 1950

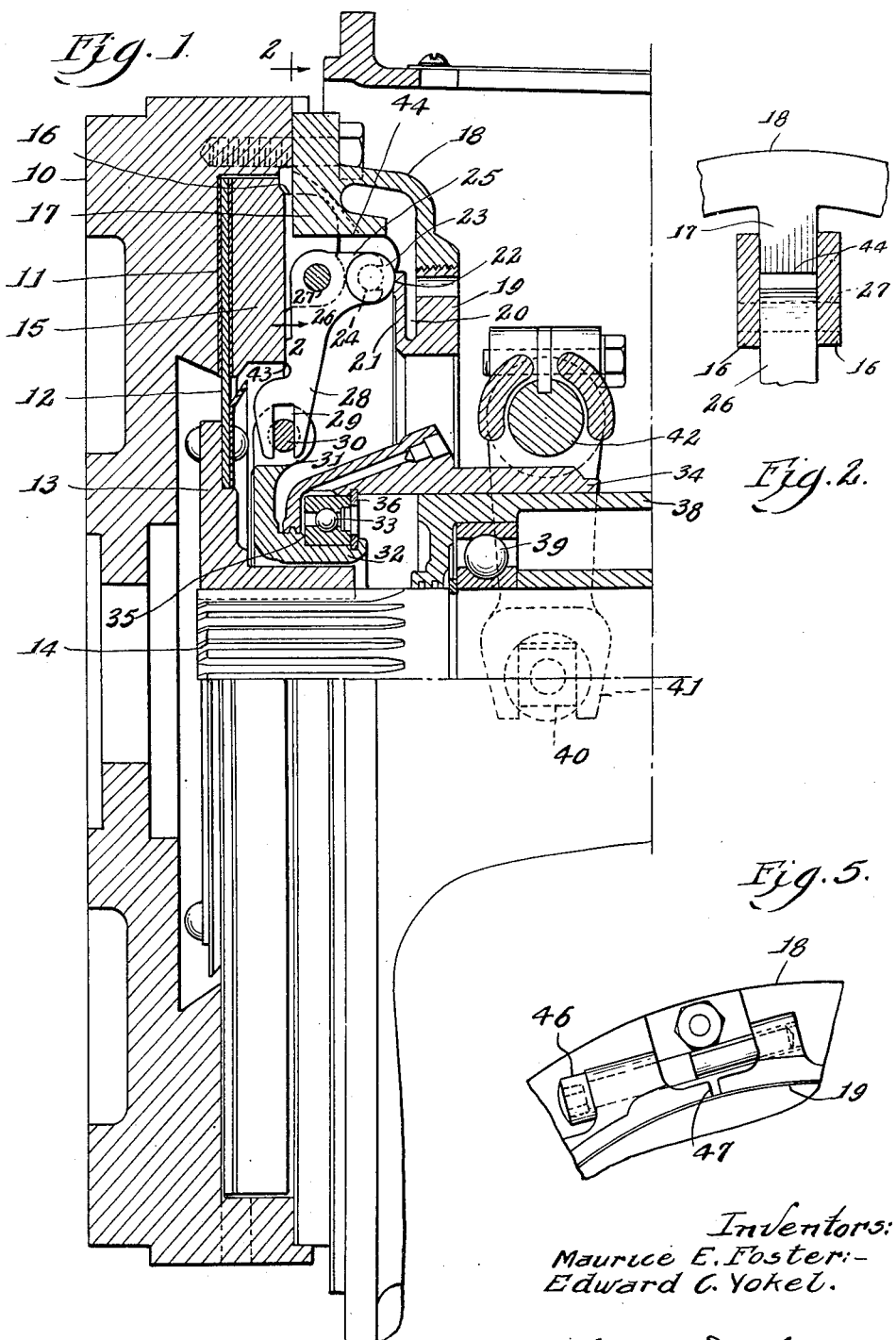

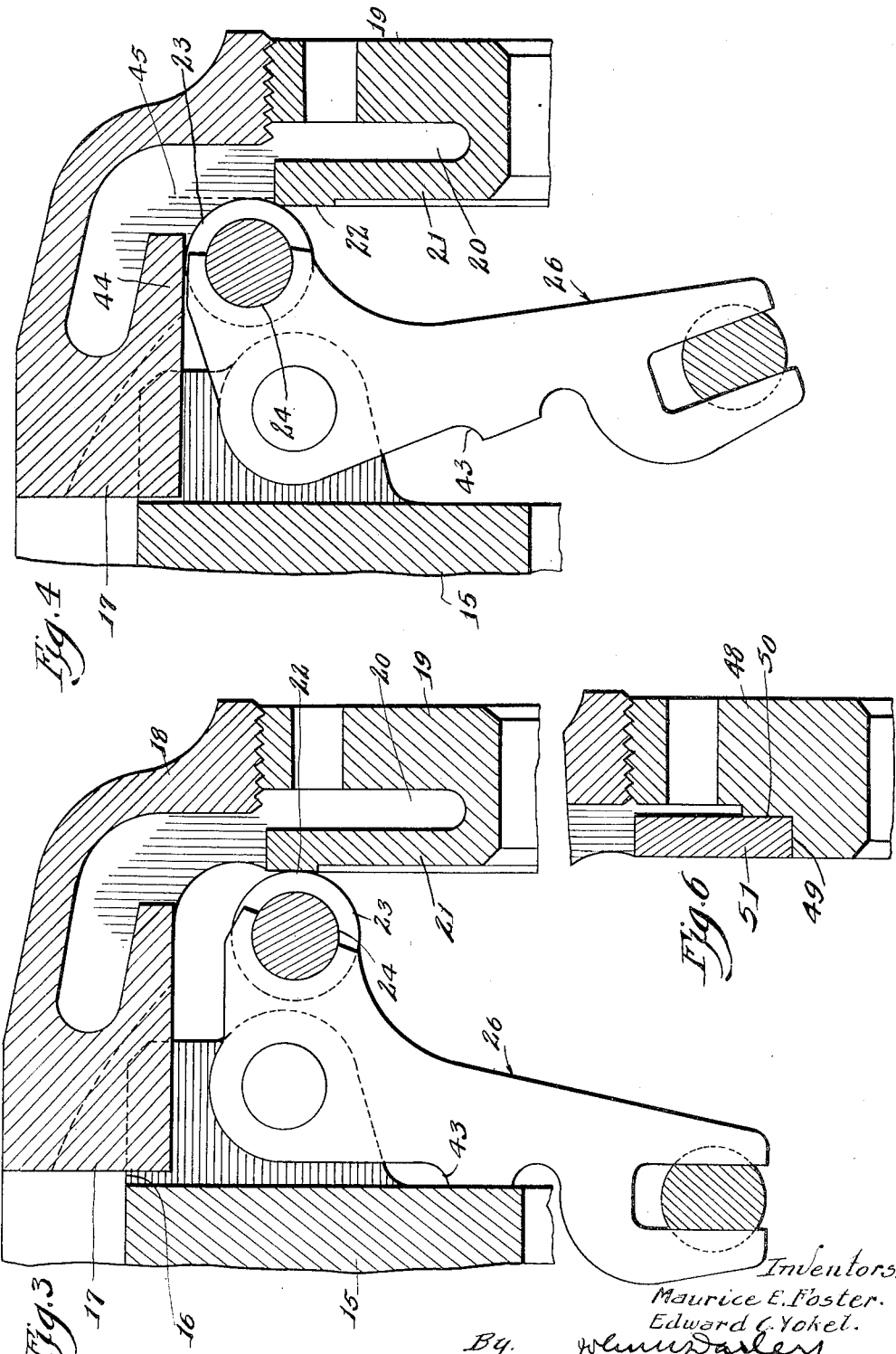

2,507,002

UNITED STATES PATENT OFFICE 2,507,002

AXIALLY ENGAGING OPPOSED CLUTCH

Maurice E. Foster and Edward C. Yokel, Rockford Ill., assignors to Twin Disc Clutch Company, Racine, Wis., a corporation of Wisconsin Application August 21, 1945, Serial No. 611,708

8 Claims. (Cl. 192—68)

Our invention relates to clutches and more particularly to that type which is engaged by mechanical actuation of the component elements as distinguished from spring loading.

One object of our invention is to provide a clutch of the friction disk type which is mechanically engaged by operating mechanism, including a plurality of levers arranged for over-center action so that the levers are locked in engaged position.

A further object is to provide a clutch of the character indicated in which engagement is effected through the medium of constant throw, short travel levers that enable the axial length of the clutch to be materially reduced in comparison with existing designs while retaining an adequate mechanical advantage in the operating mechanism for obtaining the required clamping pressure.

A further object is to provide a clutch in which more than one-half of the arc travel of the clutch levers is utilized to move the friction elements from initial to final engagement, thus distributing the shifting effort over the major portion of the lever travel with consequent greater ease in engaging the clutch.

A further object is to devise a clutch having the above characteristics in which the actuating levers fulcrum on a base having a measure of resilient flexibility that is reflected in a smooth engaging action of the clutch, a substantial avoidance of rigidity in the clutch action, and capacity for compensating for minor wear between major adjustments of the clutch and for expansion and contraction effects due to variations in operating temperatures.

A further object is to provide a clutch in which the fulcruming resiliency feature is incorporated as a part of an adjusting ring arranged for easy access and adjustment as the friction facings wear.

These and further objects of our invention will be set forth in the following specification, reference being had to the accompanying drawings, and the novel means by which said objects are effectuated will be definitely pointed out in the claims.

In the drawings:

Fig. 1 is an elevation, partly in section, of our improved clutch showing the same in engaged position.

Fig. 2 is a section along the line 2—2 in Fig. 1 showing the driving connection between the pressure plate and the carrier ring which is secured to the flywheel.

Figs. 3 and 4 are fragmentary, enlarged views showing one of the levers in engaged and disengaged positions, respectively.

Fig. 5 is a fragmentary end view of the clutch showing the arrangement for locking the adjusting ring in adjusted position.

Fig. 6 is a partial, sectional elevation showing a modified arrangement of the adjusting ring.

Referring to Fig. 1 of the drawings, the numeral 10 designates an engine flywheel which is to be regarded generally as a driving member and which is counterbored on one side to provide a clutch operating face 11. The flywheel functions as the member of the clutch which is held against axial movement and the face 11 is engaged by an annulus of friction material secured to the adjacent side of a driven plate 12 fastened to a hub 13 that is splinedly connected to a driven shaft 14 so that the plate rotates with the shaft but is capable of axial movement relative thereto. It will be understood that the terms "driving" and "driven," as applied to the flywheel 10 and shaft 14, respectively, are merely illustrative, since the direction of drive may be reversed without affecting the clutch construction presently described.

The friction annulus on the opposite side of the plate 12 is engaged by a pressure plate 15 which is drivably connected to the flywheel by means of a plurality of circumferentially spaced pairs of lugs 16 that extend from the outer face of the plate, one pair of which is shown in Fig. 2, and a plurality of comparably spaced, driving lugs 17, each of the latter fitting between a pair of the lugs 16. The lugs 17 extend radially inward from a carrier ring 18 that is bolted to the flywheel 10 and is threaded internally to receive an adjusting ring 19, the latter being offset from the pressure plate 15 to provide space for the operating levers hereinafter described.

The adjusting ring 19 is annularly recessed from its periphery as at 20 to thus form an annular tongue 21. The ring 19 is composed of a material, such as steel, and the thickness of the tongue 21 is such that it is characterized by a certain resiliency or springiness for a purpose presently explained. The tongue 21 has a bearing face 22 which serves as a fulcrum for the ends of a spool roller 23 whose intermediate portion 24 is journaled in the bifurcated end of an arm 25 of a clutch lever 26. As many of these levers may be disposed circumferentially of the clutch as operating conditions require. The extremities of the bifurcated end of the arm 25 are bent around the roller portion 24, as shown in Fig. 3, to retain the roller in position.

The lever 26 is rockably mounted on a pin 27 that is bridged between the lugs 16—16 and is provided with an arm 28 extending radially inward of the clutch. The inner end of the arm 28 is bifurcated at 29 to operably receive a pin 30 that is supported between a pair of ears 31 carried by a sleeve 32 which encircles the hub 13 in clearance relation thereto. The sleeve 32 is journaled in the inner race of a ball bearing 33 whose outer race is supported by a shifting collar 34. The bearing 33 abuts a shoulder 35 formed on the sleeve 32 and is held in this position by a spring ring 36 which is snapped into appropriate channels or grooves provided in the sleeve 32 and collar 34. Axial movements of the collar 34 accordingly effect corresponding movements of the sleeve 32.

The collar 34 is slidably mounted on a tubular member 38 which carries internally a bearing 39 in which the shaft 14 is journaled. In the construction shown, the member 38 is intended to be connected to the stationary casing of a hydraulic torque converter (not shown), but for purpose of present disclosure, it may be regarded as any convenient device for supporting the collar 34 during operation and actuation of the clutch. In accordance with usual clutch design, the collar 34 is provided with laterally extending trunnions 40 which are engaged by the bifurcated ends of a yoke 41 that is secured to a transverse, operating shaft 42 which may be rocked by any suitable means, such as a hand lever (not shown).

As already indicated, Fig. 1 shows the clutch in engaged position and, in this relation of parts, the radial distance of the pin 27 from the axis of the shaft 14 is greater than the similar distance of the roller 23 from the same axis so that the lever 26 occupies an over-center position in which it is effectively locked against disengagement (see Fig. 3). Each lever 26 is provided with a nose 43 which contacts the pressure plate 15 in the engaged position and prevents further movement of the lever in a clockwise direction as viewed in Figs. 1 and 3, thus determining the over-center position and preventing excessive overlock of the levers.

To release the clutch, it is merely necessary to move the actuating collar 34 towards the right, as viewed in Fig. 1, whereupon the lever 26 will be rocked in a counterclockwise direction to the position illustrated in Fig. 4. This rocking is facilitated by the resilient fulcrum provided by the tongue 21. In the released position, the center of gravity of the lever lies well to the right of the lever pivot so that centrifugal force acts to hold the lever in this position.

During the releasing movement, the roller 23 rides outwardly along the fulcrum face 22 and partially over the outer corner thereof until stopped by contact with the inner face 44 of the driving lug 17. In this position, the peripheral surface of the roller 23 projects only slightly beyond the fulcrum face 22, as indicated by the limiting line 45 in Fig. 4, and the distance between this line and the face 22 is a measure of the travel of the lever 26 axially of the clutch between positions of full release and initial engagement of the friction elements.

When the clutch is engaged, the lever 26 is rocked in a clockwise direction by shifting the collar 34 towards the left and the ensuing axial movement of the pressure plate 15 to gripping position is effected by the roller 23 moving radially inward over the outer corner of and along the face 22, the lever fulcruming on the tongue 21 and actuating the plate through the pin 27. The parts are arranged so that movement of the lever from the position shown in Fig. 4 to one in which the roller 23 has cleared the outer corner of and has begun to move along the face 22 effects shifting of the friction elements from a fully released to an initially engaged position and this action constitutes the first phase of the lever travel in the indicated direction. Thereafter and in the second phase, continued movement of the lever effects final engagement of the friction elements with more than one-half of the lever arc travel being available for the latter phase, thus distributing the shifting effort over the major portion of the lever travel.

The tongue provides a resilient fulcrum for the lever and constitutes an added feature of the invention. The tongue 21 yields slightly when the roller 23 rides inwardly over the outer corner of the face 22, thus insuring a comparatively soft and smooth engaging action of the clutch. Moreover, since the tongue 21 bears constantly against the roller 23 in the engaged position, it compensates for minor wear of the clutch parts, including the friction facings on the pressure plate, and for variations in operating temperatures. Major adjustments are effected by repositioning the adjusting ring 19 which is located beyond the levers 26 and is therefore readily accessible. As indicated in Fig. 5, the adjusting ring is held in adjusted position by a clamping bolt 46 mounted in the carrier ring 18 which is split at the threads as indicated by the numeral 47, the bolt bridging the split so that when drawn up, the carrier ring tightens on the adjusting ring.

In Fig. 6 is illustrated a modified arrangement of the adjusting ring which is indicated by the numeral 48. This ring is preferably made of a material having a low or practically no resilient characteristic, such as cast iron. On the clutch lever side of the ring, it is counterbored to provide the annular surface 49 normal to the plane of the ring and the annular abutment surface 50 which is normal to the surface 49. A fulcrum ring 51 is press fitted on the surface 49 and against the abutment 50. The latter surface abuts only a limited portion of the ring 51 and outwardly of this contacted zone, the ring 51 stands free of the adjusting ring 48. The thickness of the fulcrum ring 51 approximates that of the tongue 21 and since it is composed of a material, such as steel, it possesses substantially the same resilient characteristics as the tongue.

We claim:

1. In a clutch, the combination of clutch devices connectible to separate rotary parts, a pressure member connected to one of the devices and shiftable to drivably connect both devices, a fulcrum face on one of the devices, a lever mounted on the member and having a part for coacting with the face when the devices are engaged, the lever being rockable against the fulcrum face to move the member to driving position and retractible to permit the member to release, and a stop on said one device for limiting the release movement of the lever to a position in which the lever part projects beyond the fulcrum face a distance such that less than one-half of the lever arc travel is utilized in moving the lever from a position of full release to one in which the lever part begins to bear against the fulcrum face.

2. In a clutch, the combination of clutch devices connectible to separate rotary parts, a pressure member connected to one of the devices and shiftable to drivably connect both devices, a fulcrum face on one of the devices, a lever mounted on the member and having a part for coacting with the face when the devices are engaged, a stop on said one device, and means for rocking the lever through a first phase from a fully released position of the devices in which the part engages the stop to one in which the part begins to contact the face corresponding to an initial engagement of the clutch devices and thereafter further rocking the lever through a second phase against the fulcrum face to fully engage the clutch devices, the lever arc travel during the second phase being greater than the travel during the first phase.

3. In a clutch, the combination of clutch devices connectible to separate rotary parts, a pressure member connected to one of the devices and shiftable to drivably connect both devices, a fulcrum face on one of the devices, a lever pivoted on the member and having a roller for coacting with the face when the devices are engaged, a stop on said one device, and means for rocking the lever through a first phase from a fully released position of the devices in which the roller engages the stop to one in which the roller begins to ride along the face corresponding to an initial engagement of the devices and thereafter further rocking the lever through a second phase against the fulcrum face to fully engage the clutch devices, the lever arc travel during the second phase being greater than the travel during the first phase.

4. In a clutch, the combination of clutch devices connectible to separate rotary parts, a pressure member connected to one of the devices and shiftable to drivably connect both devices, an annular, resilient tongue carried by one of the devices, a lever mounted on the member and having a part for engaging the tongue, means for rocking the lever against the tongue as a fulcrum to move the member to driving position and for retracting the lever to permit the lever to move to release position, and a stop on said one device radially outward of and engageable with the lever part for limiting the release movement of the lever to a position in which the lever part projects beyond the fulcrum face of the tongue a distance not greater than that which will enable the lever to be rocked from a position in which the devices are released to one of initial engagement.

5. Actuating mechanism for a pair of clutch elements forming the gripping portions of a clutch comprising a fulcrum face on one of the elements, a lever mounted on the other element and having a part for coacting with the face when the elements are engaged, the lever being rockable against the fulcrum face to move said other element to driving position and retractible to permit said other element to release, and a stop on said one element radially outward of and engageable with the lever part for limiting the release movement of the lever to a position in which the lever part projects beyond the fulcrum face a distance such that less than one-half of the lever arc travel is utilized in moving the lever from a position of full release to one in which the lever part begins to bear against the fulcrum face.

6. Actuating mechanism for a pair of clutch elements forming the gripping portions of a clutch comprising a fulcrum face on one of the elements, a lever mounted on the other element and having a part for coacting with the face when the elements are engaged, a stop on said one element, and means for rocking the lever through a first phase from a fully released position of the elements in which the part engages the stop to one in which the part begins to contact the face corresponding to an initial engagement of the clutch elements and thereafter further rocking the lever through a second phase against the fulcrum face to fully engage the clutch elements, the lever arc travel during the second phase being greater than the travel during the first phase.

7. Actuating mechanism for a pair of clutch elements forming the gripping portions of a clutch comprising a fulcrum face on one of the elements, a lever pivoted on the other element and having a roller for coacting with the face when the elements are engaged, a stop on said one element, and means for rocking the lever through a first phase from a fully released position of the elements in which the roller engages the stop to one in which the roller begins to ride along the face corresponding to an initial engagement of the elements and thereafter further rocking the lever through a second phase against the fulcrum face to fully engage the clutch elements, the lever arc travel during the second phase being greater than the travel during the first phase.

8. In a clutch, the combination of clutch devices connectible to separate rotary parts, a pressure member connected to one of the devices and shiftable to drivably connect both devices, a resilient fulcrum face on one of the devices, a lever mounted on the member and having a part for coacting with the face when the devices are engaged, the lever being rockable against the fulcrum face to move the member to driving position and retractible to permit the member to release, and a stop on said one device radially outward of and engageable with the lever part for limiting the release movement of the lever to a position in which the lever part projects beyond the fulcrum face a distance such that less than one-half of the lever arc travel is utilized in moving the lever from a position of full release to one in which the lever part begins to bear against the fulcrum face.

MAURICE E. FOSTER.
EDWARD C. YOKEL.

REFERENCES CITED

The following references are of record in the file of this patent:

UNITED STATES PATENTS

| Number | Name | Date |
|---|---|---|
| 1,490,967 | Denneen et al. | Apr. 22, 1924 |
| 2,129,361 | Ruesenberg et al. | Sept. 6, 1938 |
| 2,251,367 | Miller | Aug. 5, 1941 |
| 2,280,356 | Spase et al. | Apr. 21, 1942 |